(12) United States Patent
Gowda et al.

(10) Patent No.: US 8,983,908 B2
(45) Date of Patent: Mar. 17, 2015

(54) FILE LINK MIGRATION FOR DECOMMISIONING A STORAGE SERVER

(71) Applicant: Red Hat, Inc., Raleigh, NC (US)

(72) Inventors: Shishir Nagaraja Gowda, Mysore (IN); Anand Vishweswaran Avati, Mysore (IN); Amar Tumballi Suryanarayan, Karnataka (IN)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 13/769,087

(22) Filed: Feb. 15, 2013

(65) Prior Publication Data

US 2014/0236895 A1    Aug. 21, 2014

(51) Int. Cl.
*G06F 17/30* (2006.01)
*G06F 3/06* (2006.01)

(52) U.S. Cl.
CPC ........ *G06F 17/30079* (2013.01); *G06F 3/0647* (2013.01)
USPC .......................................................... 707/634

(58) Field of Classification Search
CPC ........................ G06F 17/30079; G06F 3/0647
See application file for complete search history.

(56) References Cited

U.S. PATENT DOCUMENTS

| | | | |
|---|---|---|---|
| 5,886,699 A | 3/1999 | Belfiore et al. | |
| 5,951,649 A | 9/1999 | Dobbins et al. | |
| 6,697,846 B1 | 2/2004 | Soltis | |
| 6,938,039 B1 * | 8/2005 | Bober et al. | 707/704 |
| 7,080,102 B2 * | 7/2006 | O'Connell et al. | 707/617 |
| 7,418,439 B2 | 8/2008 | Wong | |
| 7,536,526 B2 * | 5/2009 | Srinivasan et al. | 711/165 |
| 7,890,469 B1 | 2/2011 | Maionchi et al. | |
| 2002/0107874 A1 | 8/2002 | DeLorme et al. | |
| 2003/0005256 A1 * | 1/2003 | Grossman et al. | 711/202 |
| 2003/0115439 A1 * | 6/2003 | Mahalingam et al. | 712/1 |
| 2003/0159006 A1 | 8/2003 | Frank et al. | |
| 2003/0163568 A1 | 8/2003 | Kano et al. | |
| 2003/0182257 A1 * | 9/2003 | O'Connell et al. | 707/1 |
| 2004/0128556 A1 | 7/2004 | Burnett | |
| 2004/0133540 A1 * | 7/2004 | Saake et al. | 707/1 |
| 2005/0071708 A1 | 1/2005 | Bartfal et al. | |
| 2006/0271754 A1 * | 11/2006 | Shibayama et al. | 711/165 |
| 2006/0294039 A1 * | 12/2006 | Mekenkamp et al. | 707/1 |
| 2007/0101084 A1 * | 5/2007 | Watanabe | 711/165 |
| 2007/0113005 A1 * | 5/2007 | Yamamoto et al. | 711/112 |
| 2007/0150499 A1 * | 6/2007 | D'Souza et al. | 707/101 |
| 2007/0245112 A1 | 10/2007 | Grubbs et al. | |
| 2008/0086518 A1 * | 4/2008 | Balakrishnan et al. | 707/204 |

(Continued)

OTHER PUBLICATIONS

USPTO Office Action for U.S. Appl. No. 13/686,091, mailed Jan. 30, 2013.
Gluster Inc., "Gluster Filesystem Unified File and Object Storage—Beta 2", Published Aug. 2011, pp. 1-27, Available at <http://hypnotoad.uchicago.edu/roll-documentation/glusterfs/6.0/Gluster_Unified_File_and_Object_Storage.pdf>, retrieved Jan. 18, 2013.

(Continued)

*Primary Examiner* — Robert Beausoliel, Jr.
*Assistant Examiner* — Richard Bowen
(74) *Attorney, Agent, or Firm* — Lowenstein Sandler LLP

(57) ABSTRACT

A first server hosted on a computer system identifies a set of file links in the first server that is associated with one or more hard links that point to file data for a file in the first server. The computer system migrates the set of files links for the file to a second server prior to migrating the file data for the file in the first server to the second server. The second server is hosted by a second computer system. The first computer system migrates the file data for the file in the first server to the second server when the migration of the set of file links for the file to the second server is complete.

17 Claims, 5 Drawing Sheets

(56) References Cited

U.S. PATENT DOCUMENTS

| | | | |
|---|---|---|---|
| 2008/0114854 A1* | 5/2008 | Wong et al. | 709/214 |
| 2008/0235300 A1* | 9/2008 | Nemoto et al. | 707/204 |
| 2008/0320062 A1* | 12/2008 | Miyamae et al. | 707/205 |
| 2009/0063393 A1* | 3/2009 | Saake et al. | 707/1 |
| 2009/0254592 A1* | 10/2009 | Marinov et al. | 707/204 |
| 2009/0307245 A1* | 12/2009 | Mullen et al. | 707/101 |
| 2009/0307276 A1* | 12/2009 | Dolan et al. | 707/202 |
| 2010/0005072 A1 | 1/2010 | Pitts | |
| 2010/0235383 A1* | 9/2010 | Kashiwase et al. | 707/769 |
| 2010/0332456 A1 | 12/2010 | Prahlad et al. | |
| 2011/0213813 A1* | 9/2011 | Leventhal et al. | 707/825 |
| 2012/0185926 A1* | 7/2012 | Topatan et al. | 726/7 |
| 2012/0330894 A1 | 12/2012 | Slik | |
| 2013/0007051 A1* | 1/2013 | Astle et al. | 707/769 |
| 2013/0007220 A1* | 1/2013 | Astle et al. | 709/219 |
| 2014/0108475 A1* | 4/2014 | Yamada et al. | 707/829 |

OTHER PUBLICATIONS

Business Wire, "Gluster Announces Apache Hadoop Storage Compatibility in Latest GlusterFS Release", Published Aug. 23, 2011, Available at <http://www.businesswire.com/news/home/20110823005899/en/Gluster-Announces-Apache-Hadoop-Storage-Compatibility-Latest>, retreived Jan. 18, 2013.

USPTO Office Action for U.S. Appl. No. 13/555,718, mailed Jan. 30, 2013.

Golub, Ben, "Why I believe in UFOS: Unified file and object storage," Computerworld Blogs, Jul. 28, 2011, 6 pages.

USPTO Office Action for U.S. Appl. No. 13/740,084, mailed May 22, 2013.

USPTO Office Action for U.S. Appl. No. 13/757,437, mailed May 17, 2013.

* cited by examiner

FILE LINK MIGRATION FOR DECOMMISIONING A STORAGE SERVER

TECHNICAL FIELD

The present disclosure relates to file migration, and more particularly, to migrating file links for decommissioning a storage server.

BACKGROUND

Data may be stored as unstructured data, for example, in files and directories in a file system. A file in the file system may have multiple file links that point to the same file data for the file. A file link can be an original file name for a file and/or an alternative file name that is implemented as a hard link for the file. A hard link is a directory entry that points to a location of the file in the file system. If the file is opened using one of its hard links, and changes are made to the file's content, then the changes can also be visible when the file is opened by an alternative hard link or the original file name of the file. The files may be stored in a data store (e.g., disk) that is coupled to a storage server in a machine in the file system. The file system can include multiple machines, multiple storage servers, and multiple data stores. A storage server may be decommissioned, for example, due to capacity reduction, problems with the machine, storage server, and/or disk, etc. When a storage server is to be decommissioned, the data (e.g., files) on the disk for the storage server should be migrated to another disk being managed by another storage server in another machine in order to prevent data loss. When the file data for the file is migrated to another storage server, the current file links usually still point to the old location of the file data. Any attempts to access the file data using the current file links typically result in errors since the file data has already been migrated to the new location.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
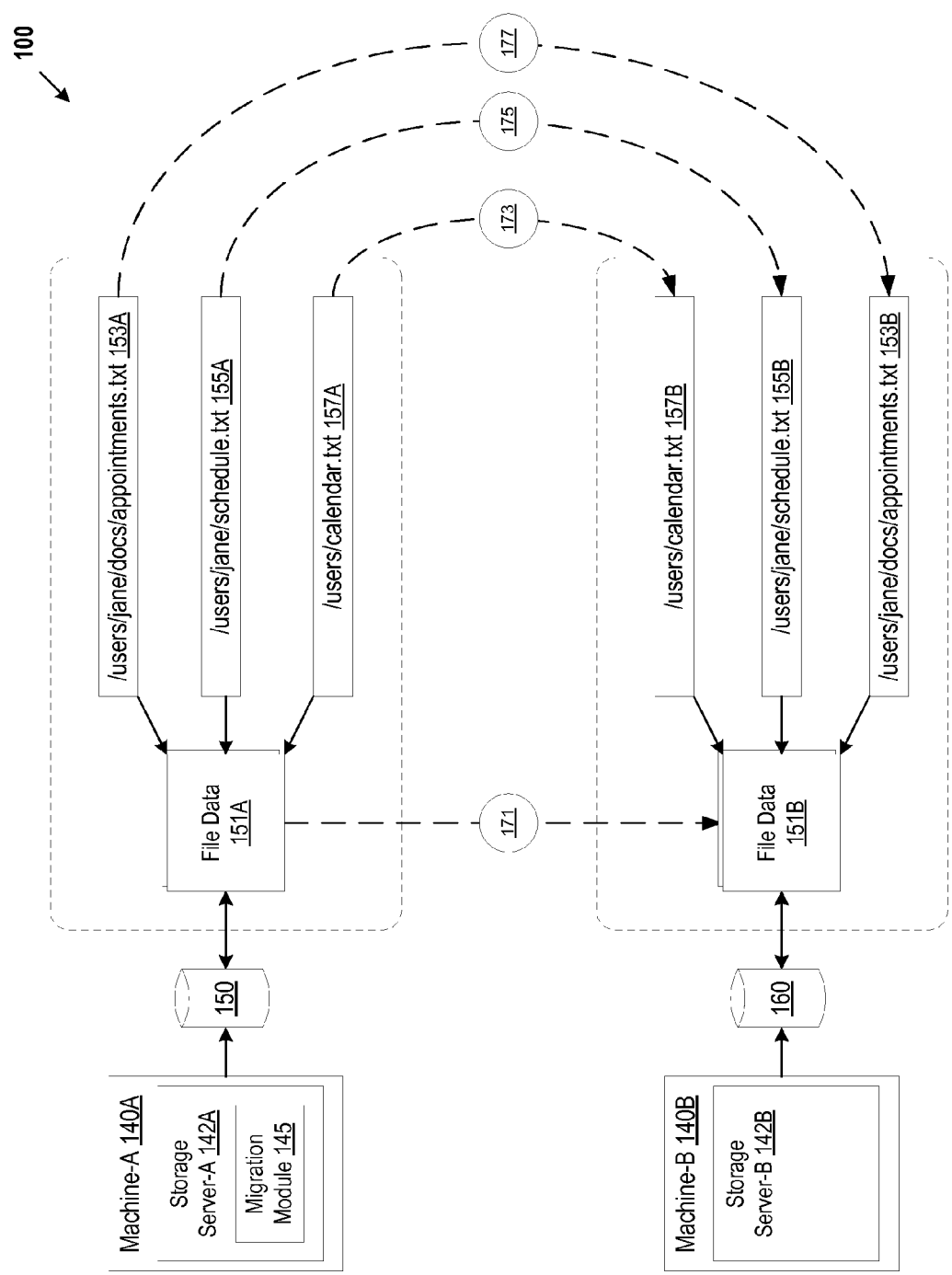
FIG. 1 illustrates an example of migrating of file links for decommissioning a storage server, in accordance with various implementations.

Described herein are a method and system for migrating file links for decommissioning a storage server, according to various implementations. Data in a file system can be stored as files and directories. The file data for a file can be accessed by multiple file names. The file names may be file links that point to the same file data. A file link can be an original file name that is pointing to the file data and/or an alternate file name implemented as a hard link pointing to the same file data. For example, a user may create a file with an original file name "calendar.txt" that is an original file link pointing to the file data for "calendar.txt". The file data for "calendar.txt" may also be accessed by alternate file names. The alternate file names can be implemented as hard links which point to the same file data for "calendar.txt". For example, the user may create another file with the file name "schedule.txt", which may be a hard link that points to the file data for "calendar.txt". The directories in the file system can form a directory level hierarchy of various levels, or tree structure of one or more directory levels in the file system. For example, there may be a top-level directory "/users". There may be one or more sub-level directories within the top-level directory. For example, there may be sub-level directories for specific users within the top-level directory "/users". For example, there may be a sub-directory "/jane" that has a path "/users/jane". The original file names and the hard links can be stored at different directory levels. For example, the original file name "calendar.txt" may be stored as "/users/calendar.txt" in the top-level directory, and the hard link "schedule.txt" may be stored as "/users/jane/schedule.txt" in the sub-level directory.

The file system can include multiple machines that host storage servers to manage the file data, and the original file names and hard links for the file data. The storage servers can be coupled to storage devices that store and organize the file data, original file names, and hard links using the directory level hierarchy. A storage server may be decommissioned, for example, due to hardware and/or software problems related to the machine and/or storage server, capacity down-scaling of the storage device for the storage server, machine maintenance, etc. The file data, original file names, hard links, and directory level hierarchy for the storage server that is being decommissioned should be migrated to a new location before the storage server is decommissioned to prevent data loss. For example, Storage Server-A on Machine-A and coupled to Disk-A may be decommissioned, and the file data, original file names, hard links, and directory level hierarchy for the Storage Server-A should be migrated to Storage Server-B on Machine-B and coupled to Disk-B.

Implementations can include a migration module, which is described in greater detail below, that may be hosted on a storage server in a machine to migrate the file data, and the file links (e.g., original file name, hard links for alternate file names), and the directory level hierarchy from a source location (e.g., Storage Server-A) to a destination location (e.g., Storage Server-B). The migration module can duplicate the directory level hierarchy of the source location at the destination location, and can duplicate the pattern of the file links (e.g., original file name, hard links for alternate file names), as implemented in the directory level hierarchy at the source location, in the corresponding directory level hierarchy at the destination location. As a result, errors can be eliminated and the file migration is more efficient since the file links (e.g., original file name, hard links for alternate file names) are valid and point to the file data at the destination location.

FIG. 1 illustrates an example of migrating of file links (e.g., original file name, hard links for alternate file names) for decommissioning a storage server, in accordance with various implementations. For example, there may be Storage Server-A 142A hosted in Machine-A 140A and Storage Server-B 142B hosted in Machine-B 140B. Storage Server-A 142A can be coupled to a data store 150 that stores file data 151A. There may be multiple file links (e.g., original file name and hard links for alternate file names) to file data 151A. For example, a user may have created a file with an original file name of "calendar.txt" 157A in "/users" that points to file data 151A, a second file named "schedule.txt" 155A in "/users/jane" as a hard link that also points to file data 151A, and a third file named "appointments.txt" 153A in "/users/jane/docs" as a hard link that also points to file data 151A.

Storage Server-A 142A may be decommissioned and can include a migration module 145 to migrate the file data 151A and file links (e.g., original file name and hard links for alternate file names) from the source location (e.g., data store 150 for Storage Server-A 142A) to a destination location (e.g., data store 160 for Storage Server-B 142B in Machine-B 140B). The migration module 145 can crawl through the various directory levels in the source location and can identify file links (e.g., original file name and hard links for alternate file names) and can migrate the file links to the destination location. The migration module 145 can duplicate the directories and the directory level hierarchy (e.g., /users, /users/jane, /users/jane/docs) of the file links in the source location in the destination location. Implementations describing the migration module crawling through the directory level hierarchy to discovery file links in a source location and to duplicate the file links and directory level hierarchy in a destination location are described in greater below in conjunction with FIG. 3.

The migration module 145 can identify the file links that correspond to the file data 151A in the source location and can migrate (173,175,177) the file links that correspond to the file data 151A to the destination location prior to migrating 171 the actual file data 151A to the destination location. For example, the migration module 145 can create file names 153B,155B,157B as file links at the destination location. Implementations describing the migration module identifying the file links that correspond to particular file data using a hard link count are described in greater below in conjunction with FIG. 3 and FIG. 4. When all of the file links that correspond to the file data 151A are migrated, the migration module 145 can migrate (171) the actual file data 151A to the destination location (e.g., data store 160 for Storage Server-B 142B). For example, the migration module 145 can create file data 151B at the destination location.

Figure 2:
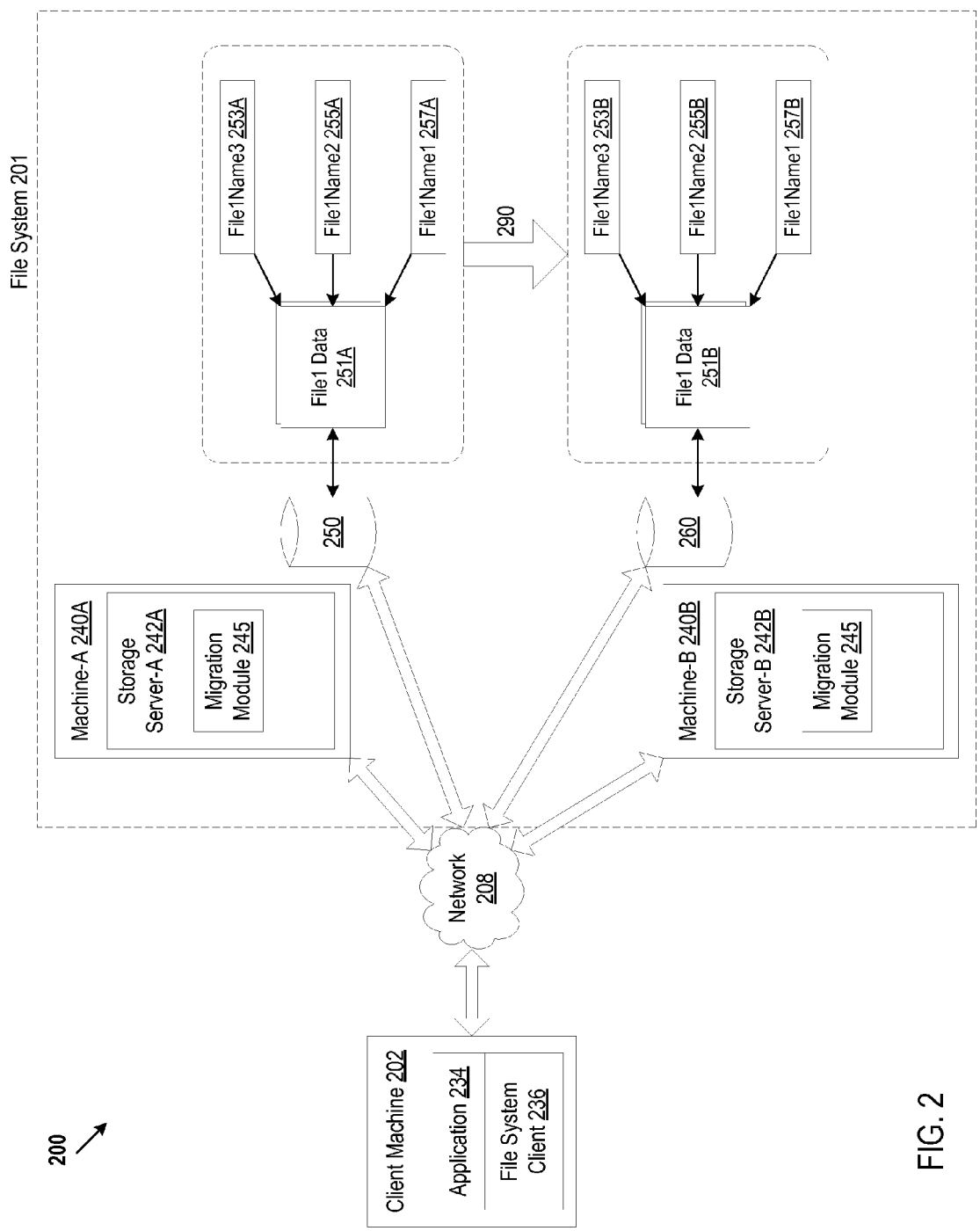
FIG. 2 illustrates an example system architecture, in accordance with various implementations.

FIG. 2 is an example system architecture 200 for various implementations. The system architecture 200 can include a distributed file system 201 coupled to one or more client machines 202 via a network 208. The network 208 may be a public network, a private network, or a combination thereof. The distributed file system 201 can be a network attached storage file system that includes one or more machines 240A-B and one or more mass storage devices, such as magnetic or optical storage based disks 250,260, solid-state drives (SSDs) or hard drives, coupled to the machines 240A-B via the network 208. The machines 240A-B can include, and are not limited to, any data processing device, such as a desktop computer, a laptop computer, a mainframe computer, a personal digital assistant, a server computer, a handheld device or any other device configured to process data.

The distributed file system 201 can store data as files and can include directories, which are virtual containers within the file system 201, in which groups of files and possibly other directories can be kept and organized. The machines 240A-B can include storage servers 242A-B to manage the files and directories in one or more levels in a directory level hierarchy for a corresponding storage server 242A-B. For example, Storage Server-A 242A may store File1 data 251A in data store 250 and may store multiple file names 253A,255A, 257A as file links that point to the File1 data 251A in various directory levels in the data store 250. For example, File1Name1 257A may be stored in a top-level directory "/users", File1Name2 255A may be stored in a sub-directory "/jane" within "/users", and File1Name3 253A may be stored in a sub-directory "/docs" within "/jane".

One or more client machines 202 can include a file system client 236 to communicate with the storage servers 242A-B in the file system 201. Examples of file system clients 236 can include, and are not limited to, native file system clients and network file system (NFS) clients. "Native" can describe support for specific operating systems. For example, a native file system client may be, and is not limited to, a file system client that supports the Linux operating system. The file system client 236 can mount the file system 201 via a mount point to access the data in the file system 201. The client machines 202 can host one or more applications 234. An application 234 can be any type of application including, for example, a web application, a desktop application, a browser application, etc. An application 234 may request access (e.g., read, write, etc.) to the data in the file system 201 via the mount point and the file system client 236. The client machine 202 may a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like.

One or more storage servers 242A-B can include a migration module 245 to migrate (290) file data for multiple files and file links for the file data from a source location to a destination location. One implementation of the migration module 245 migrating file data for multiple files and file links for the file data is described in greater detail below in conjunction with FIG. 3 and FIG. 4. For example, the migration module 245 can create the file links (e.g., file names 253B, 255B,257B) in data store 260 in a directory level hierarchy that corresponds to Storage Server-A 242A, and can create a copy of File1 data 251A as File1 data 251B in data store 260. File names 253B,255B,257B can point to File1 data 251B in data store 260.

The data stores 250,260 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 3:
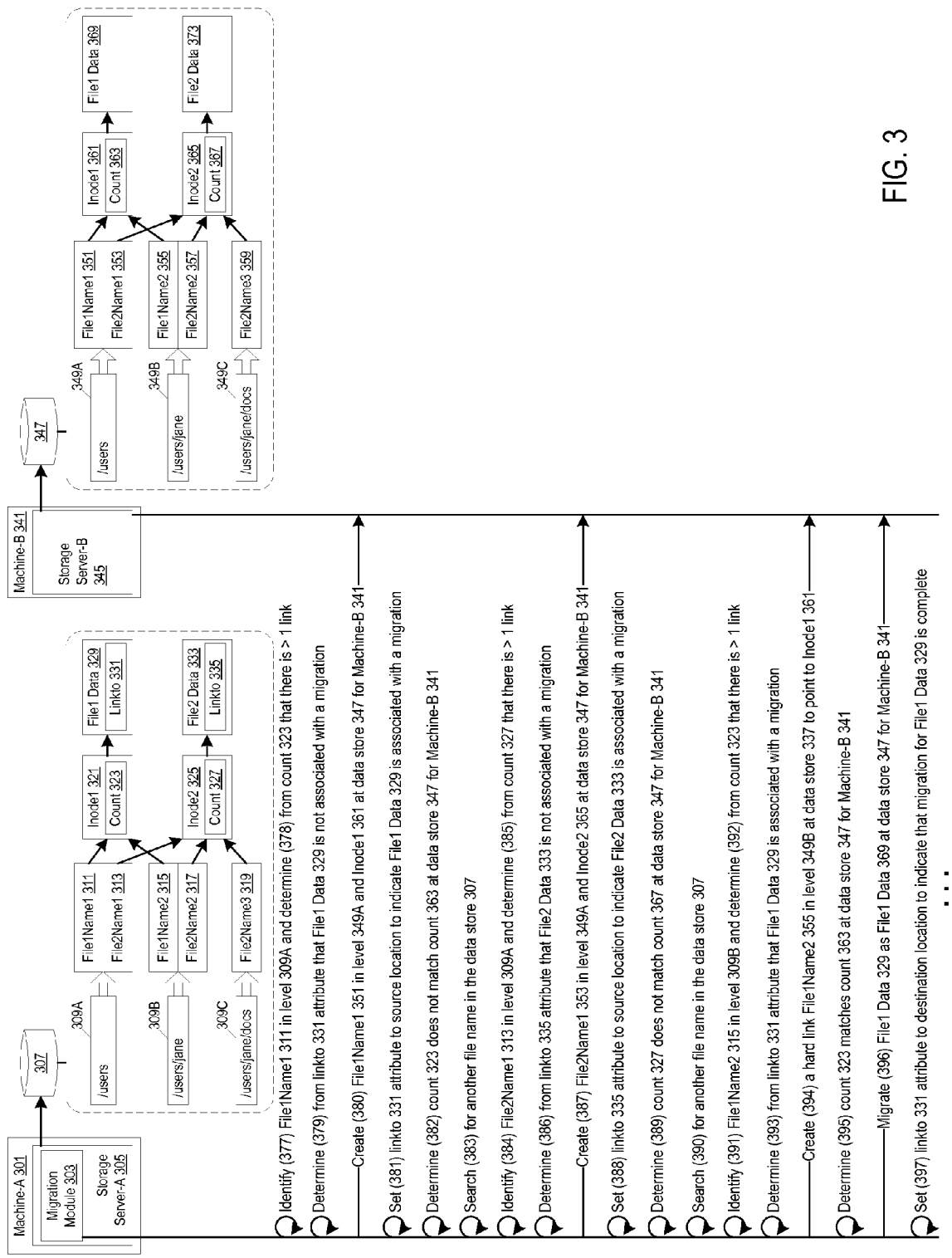
FIG. 3 is a block diagram of an implementation of a migration module for migrating file links for decommissioning a storage server.

FIG. 3 is a block diagram of an implementation of a migration module migrating file links (e.g., original file names and alternative files names for hard links) for decommissioning a storage server. Storage Server-A 305 hosted by Machine-A 301 may be decommissioned, for example, due to Machine-A 301 and/or Storage Server-A 305 being problematic. Storage Server-A 305 can be coupled to data store 307 to store file data 329,333 and file links using a directory level hierarchy that has one or more directory levels. For example, there may be a top-level 309A directory "/users", a sub-level 309B directory "/jane" within the top-level 309A directory "/users", and a sub-level 309C directory "/docs" within the sub-level 309B directory "/jane".

File1 Data 329 may be accessed by multiple file names, such as File1Name1 311 that is stored in level 309A and File1Name2 315 that is stored in level 309B. The multiple file names (e.g, File1Name1 311 and File1Name2 315) can point to the same inode (e.g., Inode1 321), which can point to File1 Data 329. An inode is a data structure that can contain information about a file system object (e.g., file), except for the file data and file names (e.g., original file name, alternate file names). The inode (e.g., Inode1 321) can include a link count 323 that stores a value indicating the number of file links (e.g., original file names and alternate file names as hard links) for particular file data (e.g., File1 Data 329). For example, count 323 may be "2". The inode (e.g., Inode1 321) can include a pointer to the actual file data (e.g., File1 Data 329).

In another example, File2 Data 333 may be accessed by multiple file names, such as File2Name1 313 that is stored in level 309A, File2Name2 317 that is stored in level 309B, and File2Name3 319 that is stored in level 309C. The multiple file names (e.g, File2Name1 313, File2Name2 317, File2Name3 319) can point to the same inode (e.g., Inode2 325), which can point to File2 Data 333. Inode2 325 can include a link count 327 that stores a value indicating the number of file links (e.g., original file names and alternate file names as hard links) for particular file data (e.g., File2 Data 333). For example, count 327 may be "3".

Storage Server-A 305 can include a migration module 303 to migrate file links and file data from the source location at the data store 307 to a destination location, such as, data store 347 that is coupled to Storage Server-B 345 in Machine-B 341. The data stores 307,347 can be mass storage devices, such as magnetic or optical storage based disks, solid-state drives (SSDs) or hard drives. The migration module 303 can crawl through various directory levels (e.g., s 309A-C) in the directory level hierarchy of the Storage Server-A 305 to identify files with multiple file links (e.g., file names) and can create a pattern of file links in the multiple levels at the destination location (e.g., data store 347).

For example, the migration module 303 may identify (377) File1Name1 311 in level 309A and determine (378) that count 323 includes a value of "2", which indicates that there is more than one link to File1 Data 329. A link count that is greater than one is an indication that the file data has at least one hard link. The migration module 303 can perform a read operation on the count 323 attribute in the Inode1 321. The "2" value in the count 323 can represent a link for File1Name1 311 and a link for File1Name2 315.

The file data (e.g., File1 Data 329, File2 Data 333) can include extended attributes that can store information that describes the file data. For example, the file data can include a "linkto" 331,335 extended attribute that can indicate the migration state of the source file data. The linkto attribute can indicate whether the source file data is associated with a file migration or not. For example, when the linkto 331,335 extended attribute does not store any value, that is an indication that the file data is not associated with a current file migration. In another example, when the linkto 331,335 extended attribute is set to the location of the source file data, that is an indication that the source file data is associated with a file migration that is in progress. In another example, the linkto 331,335 extended attribute can be set to store the location of the destination file data as an indication that the source file data is associated with a completed file migration.

The value for the "linkto" 331,335 extended attribute can be set, for example, by the migration module 303 and can be read by the migration module 303. For example, after the migration module 303 determines (378) that count 323 indicates that there are multiple file links associated with File1Name1 311, the migration module 303 may read the link to 331 extended attribute in the File1 Data 329, determine that there is no value in the linkto 331 extended attribute, and determine (379) that File1 Data 339 is not yet associated with a file migration to the destination location.

The migration module 303 can create (380) File1Name1 351 in a level 349A at the destination location (e.g., data store 347). The level 349A can correspond to level 309A at the source location. When the migration module 303 creates File1Name1 351, the Storage Server-B 345 can create an inode (e.g., Inode1 361), which File1Name1 351 points to. The Inode1 361 can include a link count 363, which may be currently set to "1" to indicate the link for File1Name1 351 at the destination location. The migration module 303 can set (381) the linkto extended attribute 331 for File1 Data 329 to the source location (e.g., location of data store 307 for Storage Server-A) to indicate that File-1 Data 329 is now associated with a file migration. Subsequently, when the migration module 303 identifies file names that point to File1 Data 329, the migration module 303 can quickly determine that the file name is associated with a file migration, and that a corresponding inode for File1 Data 329 already exists at the destination location. The migration module 303 can migrate all of the file links for File1 Data 329 to the destination location first, and then can migrate the actual file data for File1 Data 329 after all of the file links for File1 Data 329 have been successfully migrated, as described in greater detail below.

The migration module 303 can determine (382) that count 323 at the source location does not match count 363 at the destination location, which indicates that not all of the file links for File1 Data 329 have yet been migrated to the destination location. For example, the count 323 may be "2" to reflect File1Name1 311 in level 309A and File1Name2 315 in level 309B, and the count 363 at the destination location may be "1" to reflect the File1Name1 351 in level 349A at the destination location.

Since the counts 323,363 do not match, the migration module 303 can continue to search (383) for another file name that is associated with multiple file names in the data store 307. The migration module 303 can continue to search in the current directory level (e.g., level 309A). For example, the migration module 303 may identify (384) File2Name1 313, which points to File2 Data 333, in level 309, and can determine (385) that count 327 includes a value of "3", to represent the file links for File2Name 1 313 in level 309A, File2Name2 317 in level 309B, and File1Name3 319 in level 309C. The migration module 303 can perform a read operation on the count 327 attribute in the Inode2 325.

Since File2Name1 313 is associated with a link count 327 that is greater than "1", the migration module 303 can read the linkto 335 extended attribute for File2 Data 333 and may determine(386) that there is no value in the linkto 335 extended attribute, which indicates that File2 Data 333 is not yet associated with a file migration. The migration module 303 can create (387) File2Name1 353 in a level 349A at the destination location (e.g., data store 347) and an inode (e.g., Inode2 365), which File2Name1 353 points to. The Inode2 365 can include a link count 367, which may be currently set to "1" to indicate the link for File2Name1 353 at the destination location.

The migration module 303 can set (388) the linkto extended attribute 335 for File2 Data 333 to the source location (e.g., location of data store 307 for Storage Server-A) to indicate that File-2 Data 333 is now associated with a file migration. Subsequently, when the migration module 303 identifies file names that point to File2 Data 333, the migration module 303 can quickly determine that the file name is associated with a file migration, and that a corresponding inode for File2 Data 333 already exists at the destination location.

The migration module 303 can determine (389) that count 327 at the source location does not match count 367 at the destination location, which indicates that not all of the file links for File2 Data 333 have yet been migrated to the destination location. For example, the count 327 may be "3" to reflect File2Name1 313 in level 309A, File2Name2 317 in level 309B, and File2Name3 319 in level 309C, and the count 367 at the destination location may currently be "1" to reflect the File2Name1 353 in level 349A at the destination location.

Since the counts 327,367 do not match, the migration module 303 can continue to search (390) for another file link (e.g., file name) that is associated with multiple file links in the data store 307. The migration module 303 can continue to search in the current directory level or a next directory level. For example, the migration module 303 may identify (391) File1Name2 315 in the next directory level (e.g., level 309B), which points to File1 Data 329, and can determine (392) from count 323 that there is more than one file link for File1 Data 329, which indicates that File1 Data 329 has at least one hard link.

Since File1Name2 315 is associated with a link count 323 that is greater than "1", the migration module 303 can read the linkto 335 extended attribute for File1 Data 329 and may determine (393) that the linkto 335 extended attribute is set to the source location, which indicates that File1 Data 329 is already associated with a file migration to the destination location, and that the corresponding inode for File1 Data 329 is already created at the destination location. The migration module 303 can create File1Name2 355 in level 349B at the destination location as a hard link that points to Inode1 361 for File1 Data 369 at the destination location. The count 363 can be incremented by one to reflect File1Name2 355 in level 349B. For example, count 363 may be incremented from "1" to "2".

The migration module 303 can determine (395) the count 323 value of "2" at the source location now matches the count 367 value of "2" at the destination location, which indicates that all of the file links for File1 Data 329 have been migrated to the destination location. Since the counts 323,363 match, the migration module 303 can migrate (396) the actual File1 Data 329 to the destination location as File1 Data 369 in data store 347 for Machine-B 341. The migration module 303 can create a copy of File1 Data 329 as File1 Data 369 at the destination location. The copy is hereinafter referred to as the migrated file or migrated file data. The migration module 303 can set the linkto 331 extended attribute for File1 Data 329 at the source location to the destination location to change the migration state for File1 Data 329 to indicate that the migration for File1 Data 329 is complete. With the linkto 331 extended attribute now set to the destination location, operations (e.g., read, write, etc.) can now be directed to and performed on the migrated file data at the destination location. The migration module 303 can continue to migrate file links to the destination location and file data to the destination location for the various file names in the directory levels.

Figure 4:
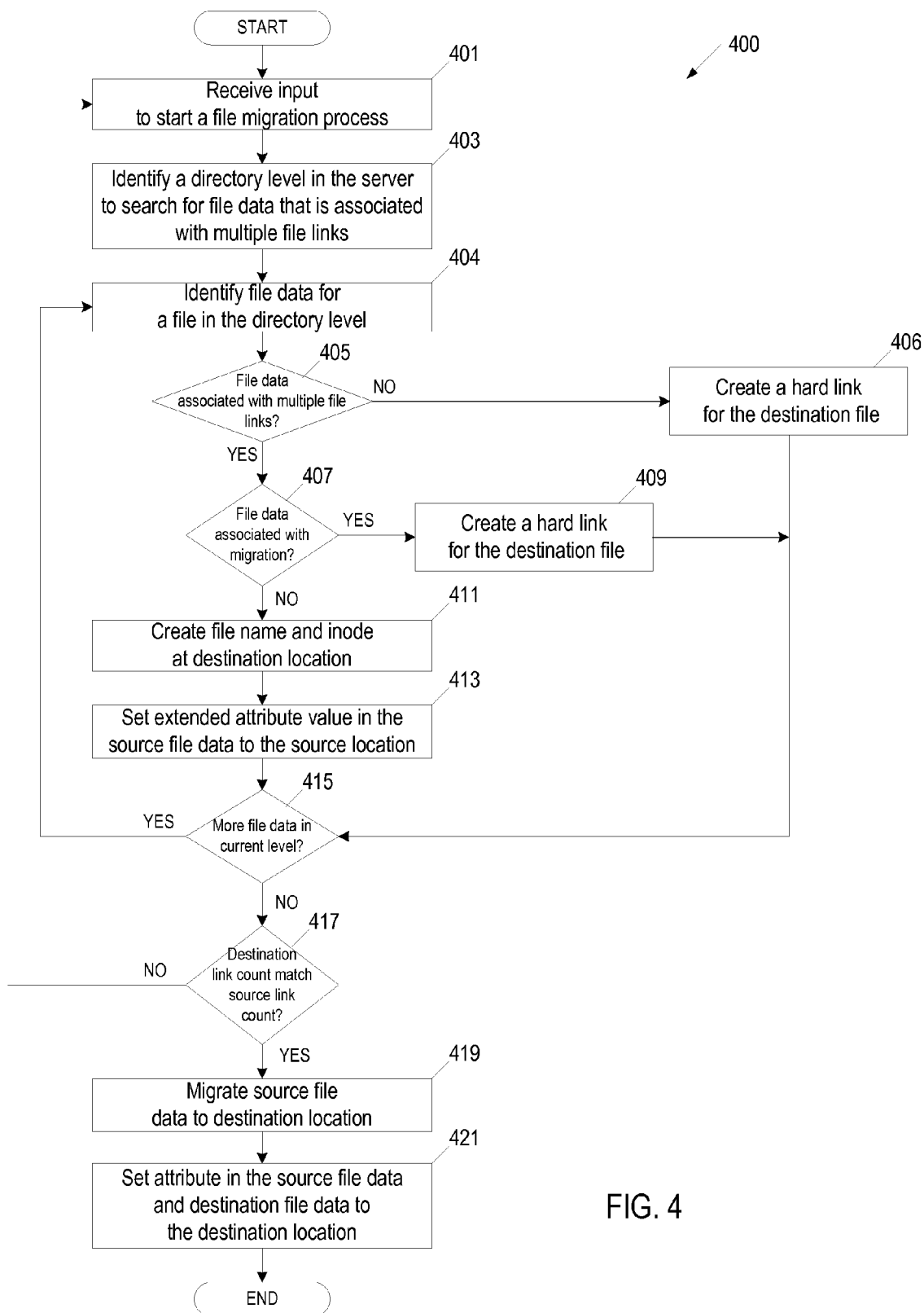
FIG. 4 is a flow diagram illustrating an implementation for a method for migrating file links for decommissioning a storage server.

FIG. 4 is a flow diagram illustrating an implementation for a method for migrating file links for decommissioning a storage server. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a migration module 145 in a storage server 142A in a machine 140A of FIG. 1.

At block 401, the server receives input to start a file migration process. The input can be user (e.g., system administrator) input. At block 403, the server identifies a first directory level to search for file data that is associated with multiple file links. The directory level is in the directory level hierarchy of the server that is to be decommissioned. For example, the first directory level may be a top-level directory. The input may be user (e.g., system administrator) input received via a user interface that is coupled to the migration module in the server. The user interface may be a graphical user interface, a command line interface, etc. The server may identify a level in the directory level hierarchy of the server using configuration data that is stored in a data store that is coupled to the migration module. For example, the configuration data may specify a file path and/or volume name which the server may use to identify a directory and/or directory level to start searching for file data of files that are associated with multiple file links. The configuration data may be user (e.g., system administrator) defined. For example, the server may identify that a top-level directory "/users" in the directory level hierarchy should be searched for file data for files that are associated with multiple file links.

At block 404, the server determines whether file data of a file is associated with multiple file links (e.g., original file name and one or more alternate file names as hard links) in the current directory level. The server may read a link count in an inode that corresponds to a file name for file data to determine whether the file data is associated with multiple file links. If the link count is not greater than one (block 405), the server determines that the file data is not associated with any hard links at creates and stores tracking data to identify the file data for one or more files in the directory level hierarchy that are not associated with hard links at block 406. In one implementation, as an optimization of resources, the server can first migrate file data for the files that are associated with hard links and can use the tracking data to subsequently migrate file data for the files that are not associated with hard links.

If the link count is greater than one (block 405), the server determines that the file data for the file is associated with at least one hard link, and the server determines the migration state associated with the file link (e.g., file name) and determines whether the file name is associated with a file migration or not at block 407. For example, the server may read a linkto extended attribute in the file data. If the linkto attribute is set to the source location (block 407), the server determines that the file name is associated with a file migration and migrates the file name to the destination location at block 409. The server can migrate the file name to the destination location by creating a hard link, which corresponds to the file name, at the destination location at block 409. The server can execute a command to create the hard link and to configure the hard link to point to the location of the file. For example, in Linux, the command may be "link (<path of original file>,<path of hard link>)". The server can create the hard link in a corresponding directory level at the destination location. The link count that is associated with the file name at the destination location can be incremented.

If the linkto attribute is not set to the source location (block 407), the server migrates the file name to the destination location at block 411. The server can migrate the file name to the destination location by creating the file name and an inode at the destination location. The server can create the file name in a directory level at the destination location that corresponds to the directory level at the source location. The file name can point to the inode at the destination location. The inode at the destination location can include a link count, which may be set at "1" to represent the newly created file name at the destination location.

At block 413, the server sets the value for an extended attribute (e.g., linkto extended attribute) in the source file data to the source location to change the migration state to indicate that the source file data is now associated with a file migration. Subsequently, when the server identifies any file names that may be associated with this particular source file data, the server can identify that the file name is associated with a file migration and that the corresponding inode for the source file data is already created at the destination location. At block 415, the server determines whether there is another file link (e.g., file name) in the current directory level. If there is another file link (e.g., file name) in the current directory level, the server returns to block 405 to identify a file link (e.g., file name) that is associated with multiple file links. If there is not another file link (e.g., file name) in the current directory level (block 415), the server determines whether the link count for the destination file data matches the link count for the source file data at block 417. If the link count does not match, the server returns to block 403 to identify a next directory level in the directory level hierarchy for the server. For example, the server identifies a sub-directory "/jane" in the top-level directory "/users".

If the link count for the file data at the destination location matches the link count for the file data at the source location, the server migrates the source file data to the destination location at block 419. The server can create a copy of the source file data at the destination location. The copy of file data at the destination location becomes the migrated file data. At block 421, the server sets the extended attributed (e.g., linkto extended attribute) at the source file data to the destination location to change the migration state for the source file data to indicate that the migration is complete. Operations (e.g., read, write, etc.) for the source file data can be redirected to and performed on the migrated data at the destination location. The server can iterate through at least a portion of method 400. The number of iterations can be based on the number of file names, file data, and/or directory levels for the server.

Figure 5:
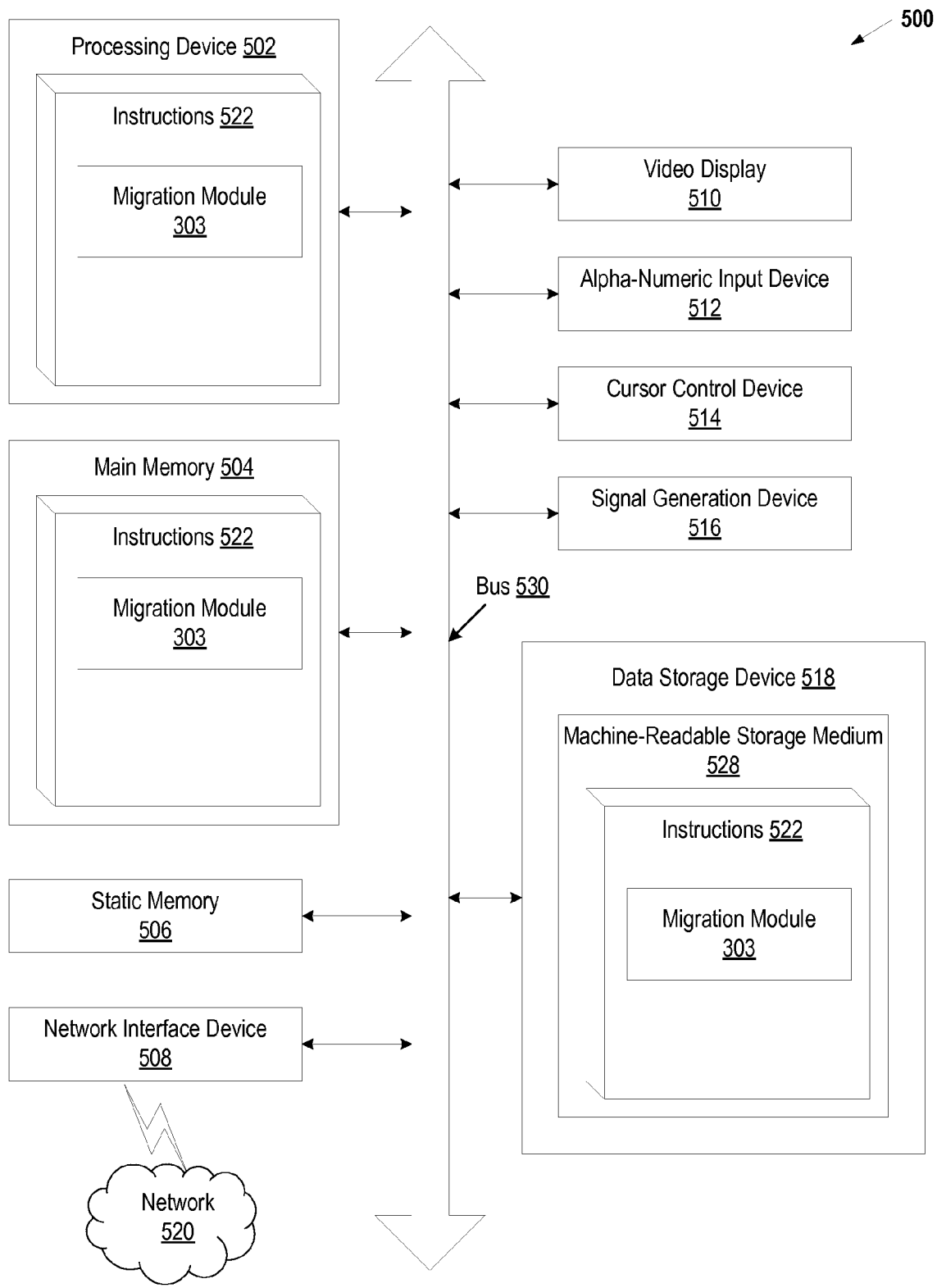
FIG. 5 is a block diagram of an example computer system that may perform one or more of the operations described herein.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for a migration module (e.g., migration module 303 of FIG. 3) and/or a software library containing methods that call modules in a migration module. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "migrating" or "creating" or "setting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method, comprising:
   identifying, by a processing device, a first file link referencing a file residing at a first computer system;
   identifying, at the first computer system, a first data structure referenced by the first file link, the first data structure comprising information about the file, the information including a first link count and excluding file data and file names;
   responsive to determining that an extended attribute of the first data structure indicates that the file is associated with a current migration operation, creating a second data structure at a second computer system, wherein the second data structure comprises information about the file including a second link count and excluding file data and file names;
   creating a second file link to reference the second data structure at the second computer system; and
   responsive to determining that the first link count matches the second link count, migrating file data referenced by the first data structure to the second computer system and modifying the extended attribute to indicate that the migration operation has been completed.

2. The method of claim 1, wherein the first file link is provided by one of: a name of the file or a hard link referencing the file.

3. The method of claim 1, wherein the second file link is provided by one of: a name of the file or a hard link referencing the file.

4. The method of claim 1, wherein at least one of the first data structure and the second data structure is provided by an inode.

5. The method of claim 1, wherein identifying the first file link comprises crawling through one or more directory levels.

6. The method of claim 1, further comprising:
   responsive to determining that the first link count does not match the second link count, identifying a third file link referencing the file.

7. A non-transitory computer-readable storage medium including instructions that, when executed by a processing device, cause the processing device to perform operations comprising:
   identifying, by the processing device, a first file link referencing a file residing at a first computer system;
   identifying, at the first computer system, a first data structure referenced by the first file link, the first data structure comprising information about the file, the information including a first link count and excluding file data and file names;
   responsive to determining that an extended attribute of the first data structure indicates that the file is associated with a current migration operation, creating a second data structure at a second computer system, the second data structure corresponding to the first data structure, wherein the second data structure comprises information about the file including a second link count and excluding file data and file names;
   creating a second file link to reference the second data structure at the second computer system; and
   responsive to determining that the first link count matches the second link count, migrating file data referenced by the first data structure to the second computer system and modifying the extended attribute to indicate that the migration operation has been completed.

8. The non-transitory computer-readable storage medium of claim 7, wherein the first file link is provided by one of: a name of the file or a hard link referencing the file.

9. The non-transitory computer-readable storage medium of claim 7, wherein the second file link is provided by one of: a name of the file or a hard link referencing the file.

10. The non-transitory computer-readable storage medium of claim 7, wherein at least one of the first data structure and the second data structure is provided by an inode.

11. The non-transitory computer-readable storage medium of claim 7, wherein identifying the first file link comprises crawling through one or more directory levels.

12. The non-transitory computer-readable storage medium of claim 7, further comprising executable instructions causing the processing device to perform operations comprising:
    responsive to determining that the first link count does not match the second link count, identifying a third file link referencing the file.

13. A system comprising:
a memory; and
a processing device coupled to the memory, the processing device to:
identify a first file link referencing a file residing at a first computer system;
identify, at the first computer system, a first data structure referenced by the first file link, the first data structure comprising information about the file, the information including a first link count and excluding file data and file names;
responsive to determining that an extended attribute of the first data structure indicates that the file is associated with a current migration operation, create a second data structure at a second computer system, the second data structure corresponding to the first data structure, wherein the second data structure comprises information about the file including a second link count and excluding file data and file names;
create a second file link to reference the second data structure at the second computer system; and
responsive to determining that the first link count matches the second link count, migrate file data referenced by the first data structure to the second computer system and modify the extended attribute to indicate that the migration operation has been completed.

14. The system of claim 13, wherein the first file link is provided by one of: a name of the file or a hard link referencing the file.

15. The system of claim 13, wherein the second file link is provided by one of: a name of the file or a hard link referencing the file.

16. The system of claim 13, wherein at least one of the first data structure and the second data structure is provided by an inode.

17. The system of claim 13, wherein identifying the set of file links comprises crawling through one or more directory levels.

* * * * *